(12) United States Patent
Verma et al.

(10) Patent No.: US 11,829,743 B2
(45) Date of Patent: Nov. 28, 2023

(54) METHOD AND SYSTEM FOR PROVIDING CUSTOMIZED ROLLOUT OF FEATURES

(71) Applicant: Microsoft Technology Licensing, LLC

(72) Inventors: Nidhi Verma, Redmond, WA (US); Divyachapan Sridharan Padur, Bothell, WA (US); Zohar Raz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

(21) Appl. No.: 17/488,688

(22) Filed: Sep. 29, 2021

(65) Prior Publication Data

US 2023/0106021 A1    Apr. 6, 2023

(51) Int. Cl.
| | |
|---|---|
| *G06F 8/65* | (2018.01) |
| *G06F 9/451* | (2018.01) |
| *G06N 20/00* | (2019.01) |
| *G06F 8/60* | (2018.01) |

(52) U.S. Cl.
CPC ............... *G06F 8/65* (2013.01); *G06F 9/451* (2018.02); *G06N 20/00* (2019.01)

(58) Field of Classification Search
CPC ........ G06F 8/65; G06F 9/451; G06F 9/44505; G06F 8/60; G06N 20/00
See application file for complete search history.

(56) References Cited

U.S. PATENT DOCUMENTS

| | | |
|---|---|---|
| 7,149,789 B2 | 12/2006 | Slivka et al. |
| 9,442,715 B2 | 9/2016 | Zhang et al. |
| 9,552,366 B2 | 1/2017 | Suryanarayanan et al. |
| 10,185,549 B2 | 1/2019 | Simek et al. |
| 10,200,446 B2 | 2/2019 | Hui et al. |

(Continued)

FOREIGN PATENT DOCUMENTS

| | | |
|---|---|---|
| GB | 2554069 A | 3/2018 |
| TR | 2022019009 A2 | 1/2023 |

OTHER PUBLICATIONS

U.S. Appl. No. 17/137,589, filed Dec. 30, 2020.

(Continued)

*Primary Examiner* — Daxin Wu
(74) *Attorney, Agent, or Firm* — NovoTechIP International PLLC

(57) ABSTRACT

A method of and system for customizing a rollout process of application features includes providing a list of one or more application features for display on a user interface screen, the software application features being application features that are scheduled for a staged rollout, enabling selection of one of the application features for enrolling in late-stage rollout or opting out of the staged rollout, receiving a request for enrolling a user entity in late-stage rollout or opting the user entity out of the staged rollout, storing a property associated with the user entity in a data store, the property indicative of the user entity enrolling in late-stage rollout or opting out of the staged rollout, accessing the stored property, when selecting a plurality of enterprises or users for the staged rollout of the application feature, and depending on the accessed property, selecting the user entity for late-stage rollout or not selecting the user entity for the staged rollout.

20 Claims, 8 Drawing Sheets

(56) References Cited

U.S. PATENT DOCUMENTS

| | | | |
|---|---|---|---|
| 10,572,240 B2 | 2/2020 | Shantharam et al. | |
| 10,649,765 B2 | 5/2020 | Kludy | |
| 10,673,955 B2 | 6/2020 | Fransazov et al. | |
| 10,691,445 B2 | 6/2020 | Garg et al. | |
| 10,915,379 B1* | 2/2021 | Verma | G06F 9/5072 |
| 11,138,646 B2 | 10/2021 | Bermudez et al. | |
| 11,144,365 B1 | 10/2021 | Gordon et al. | |
| 11,150,783 B1* | 10/2021 | Kim | G06F 3/0482 |
| 11,372,634 B1 | 6/2022 | Gabrielson et al. | |
| 11,470,182 B1 | 10/2022 | Virtser et al. | |
| 11,487,900 B2 | 11/2022 | Obembe et al. | |
| 11,570,183 B2 | 1/2023 | Mangayil et al. | |
| 2012/0102480 A1 | 4/2012 | Hopmann et al. | |
| 2012/0212321 A1 | 8/2012 | Keener et al. | |
| 2017/0017478 A1 | 1/2017 | Briggs et al. | |
| 2017/0132123 A1 | 5/2017 | Ditullio et al. | |
| 2017/0192772 A1* | 7/2017 | Islam | G06F 11/14 |
| 2018/0203684 A1* | 7/2018 | Shuvali | G06F 8/65 |
| 2018/0322038 A1 | 11/2018 | Thazhathekalam et al. | |
| 2018/0365131 A1 | 12/2018 | Armitage | |
| 2019/0097825 A1* | 3/2019 | Kan | G06F 16/951 |
| 2019/0196805 A1* | 6/2019 | Lee | G06F 21/6209 |
| 2020/0019393 A1 | 1/2020 | Vichare et al. | |
| 2020/0019400 A1* | 1/2020 | Zhao | G06F 11/1433 |
| 2020/0104122 A1* | 4/2020 | Pechacek | G06Q 10/103 |
| 2020/0287793 A1* | 9/2020 | Buck | H04L 41/0806 |
| 2020/0379744 A1 | 12/2020 | Bhupati et al. | |
| 2020/0403855 A1 | 12/2020 | Sarood et al. | |
| 2021/0117172 A1* | 4/2021 | Gopinathan Nair | G06F 8/60 |
| 2022/0207448 A1 | 6/2022 | Krishnaswamy et al. | |
| 2022/0222273 A1 | 7/2022 | Holmes-higgin et al. | |
| 2022/0366340 A1* | 11/2022 | Chen | G06Q 30/0282 |

OTHER PUBLICATIONS

Ouyang, et al., "Delayed Switch: Cloud service upgrade with low availability and capacity loss", In Proceedings of the IEEE 5th International Conference on Software Engineering and Service Science, Jun. 27, 2014, pp. 1158-1161.

"Notice of Allowance Issued in U.S. Appl. No. 17/137,589", dated Nov. 17, 2022, 7 Pages.

"Final Office Action Issued in U.S. Appl. No. 17/137,589", dated Aug. 10, 2022, 14 Pages.

"International Search Report and Written Opinion Issued in PCT Patent Application No. PCT/US22/040015", dated Nov. 3, 2022, 15 Pages.

"Non Final Office Action Issued in U.S. Appl. No. 17/137,589", dated Mar. 30, 2022, 17 Pages.

Khemissa, et al., "Recommendations for IoT Firmware Update Processes", Retrieved From: https://downloads.cloudsecurityalliance.org/assets/research/internet-of-things/recommendations-for-iot-firmware-update-processes.pdf, Sep. 2018, 12 Pages.

Cunningham, Paul, "The Debate Over Enabling New Office 365 Features by Default", Retrieved from: https://practical365.com/blog/debate-enabling-new-office-365-features-default/, Mar. 30, 2017, 12 Pages.

Deb, et al., "Under the Hood of Uber's Experimentation Platform", Retrieved from: https://eng.uber.com/xp/, Aug. 28, 2018, 18 Pages.

Holtzman, et al., "Opt in to Early Access Updates", Retrieved from: https://web.archive.org/web/20201021055903/https://docs.microsoft.com/en-us/power-platform/admin/opt-in-early-access-updates, Sep. 8, 2020, 12 Pages.

Jiang, et al., "Why Tenant-Randomized A/B Test is Challenging and Tenant-Pairing May Not Work", Retrieved from: https://www.microsoft.com/en-us/research/group/experimentation-platform-exp/articles/why-tenant-randomized-a-b-test-is-challenging-and-tenant-pairing-may-not-work/, Nov. 4, 2020, 8 Pages.

Kirk, Elliot, "Controlled Feature Roll-outs in Microsoft Edge", Retrieved from: https://techcommunity.microsoft.com/t5/articles/controlled-feature-roll-outs-in-microsoft-edge/m-p/763678/highlight/true#M1358, Jul. 18, 2019, 11 Pages.

Liu, et al., "Enterprise-Level Controlled Experiments at Scale: Challenges and Solutions", In Proceedings of Euromicro Conference on Software Engineering and Advanced Applications, Aug. 28, 2019, 9 Pages.

"International Search Report and Written Opinion Issued in PCT Application No. PCT/US21/058027", dated Feb. 10, 2022, 11 Pages.

Saveski, et al., "Detecting Network Effects: Randomizing Over Randomized Experiments", In Proceedings of the International Conference on Knowledge Discovery and Data Mining, Aug. 13, 2017, 9 Pages.

Xia, et al., "Safe Velocity: A Practical Guide to Software Deployment at Scale using Controlled Rollout", In Proceedings of the 41st International Conference on Software Engineering: Software Engineering in Practice, May 25, 2019, pp. 11-20.

Zhao, et al., "Safely and Quickly Deploying New Features with a Staged Rollout Framework Using Sequential Test and Adaptive Experimental Design", In Repository of arXiv:1905.10493v1, May 25, 2019, 12 Pages.

"Multi-cloud Database Management: Architectures, Use Cases, and Best Practices", Retrieved from: https://cloud.google.com/architecture/multi-cloud-database-management, Oct. 28, 2022, 34 Pages.

Fisher, Jennifer D., "VMware Taps Partners to Scale Customer Success Effort", Retrieved From: https://deloitte.wsj.com/articles/vmware-taps-partners-to-scale-customer-success-effort-01647025494, Mar. 11, 2022, 8 Pages.

* cited by examiner

| STAGES | 1 | 2 | 3 | 4 | 5 | 6 |
|---|---|---|---|---|---|---|
| TIME PERIOD | DAY 1 | DAY 2 | DAY 3 | DAY 4 | DAY 6 | DAY 6 |
| POPULATION SIZE | 5% | 20% | 50% | 75% | 95% | 99% |
| ENTERPRISE POPULATION SIZE | 50% | 49% | 51% | 50% | 49.5% | 50% |
| CONSUMER POPULATION SIZE | 50% | 51% | 49% | 50% | 51.5% | 50% |

FIG. 2

METHOD AND SYSTEM FOR PROVIDING CUSTOMIZED ROLLOUT OF FEATURES

BACKGROUND

With the development of cloud computing, release of new or improved software application features has become more common. That is because features can be released directly to individual users and/or enterprises via a computer network. As a result, and because new features are being constantly developed, new or improved features are rolled out to users frequently. Because a new feature is likely to have unknown defects or design flaws, new features are sometimes not provided to all users at the same time. Instead, a new feature may be rolled out in stages to different groups of users. For example, a small percentage of users may receive the new feature first. Once this group has utilized the feature for a given time period and if they have not encountered significant problems, the feature may be provided to a next group of users. This process may be gradually ramped up until all or most users receive the new feature. In this manner, if errors and defects are encountered, they can be corrected before the feature is rolled out to other users.

The process of determining which users or user groups should be allocated to each stage of the rollout process is often either randomized or controlled by the entity releasing the feature. As a result, users have very little control over when and how they receive new features. Furthermore, the current mechanisms do not take into account specific circumstances of users or enterprises. This can lead to problems for certain individual users or enterprises, who for various reasons, may not desire to receive new features, as such result in lower customer satisfaction.

Hence, there is a need for improved systems and methods for rolling out new software application features.

SUMMARY

In one general aspect, the instant disclosure describes a data processing system having a processor and a memory in communication with the processor, where the memory comprises executable instructions that, when executed by the processor, cause the data processing system to perform multiple functions. These functions may providing a list of one or more software application features for display on a user interface screen, the one or more software application features being software application features that are scheduled for a staged rollout, enabling selection of one of the one or more software application features for enrolling in late-stage rollout or opting out of the staged rollout, receiving a request for enrolling a user entity in late-stage rollout or opting the user entity out of the staged rollout, storing a property associated with the user entity in a data store, the property indicative of the user entity enrolling in late-stage rollout or opting out of the staged rollout, accessing the stored property, when selecting a plurality of enterprises or users for the staged rollout of the one of the one or more software application features, and depending on the accessed property, selecting the user entity for late-stage rollout or not selecting the user entity for the staged rollout.

In another general aspect the instant disclosure describes a method for customizing a rollout process of software application features. The method may include providing a list of one or more software application features for display on a user interface screen, the one or more software application features being software application features that are scheduled for a staged rollout, enabling selection of one of the one or more software application features for enrolling in late-stage rollout or opting out of the staged rollout, receiving a request for enrolling a user entity in late-stage rollout or opting the user entity out of the staged rollout, storing a property associated with the user entity in a data store, the property indicative of the user entity enrolling in late-stage rollout or opting out of the staged rollout, accessing the stored property, when selecting a plurality of enterprises or users for the staged rollout of the one of the one or more software application features, and depending on the accessed property, selecting the user entity for late-stage rollout or not selecting the user entity for the staged rollout.

In yet another general aspect, the instant disclosure describes a non-transitory computer readable medium on which are stored instructions that when executed cause a programmable device to provide a list of one or more software application features for display on a user interface screen, the one or more software application features being software application features that are scheduled for a staged rollout, enable selection of one of the one or more software application features for enrolling in late-stage rollout or opting out of the staged rollout, receive a request for enrolling a user entity in late-stage rollout or opting the user entity out of the staged rollout, store a property associated with the user entity in a data store, the property indicative of the user entity enrolling in late-stage rollout or opting out of the staged rollout, access the stored property, when selecting a plurality of enterprises or users for the staged rollout of the one of the one or more software application features, and depending on the accessed property, select the user entity for late-stage rollout or not selecting the user entity for the staged rollout.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 is an example plan for a staged rollout of a new feature.

DETAILED DESCRIPTION

Figure 1A:
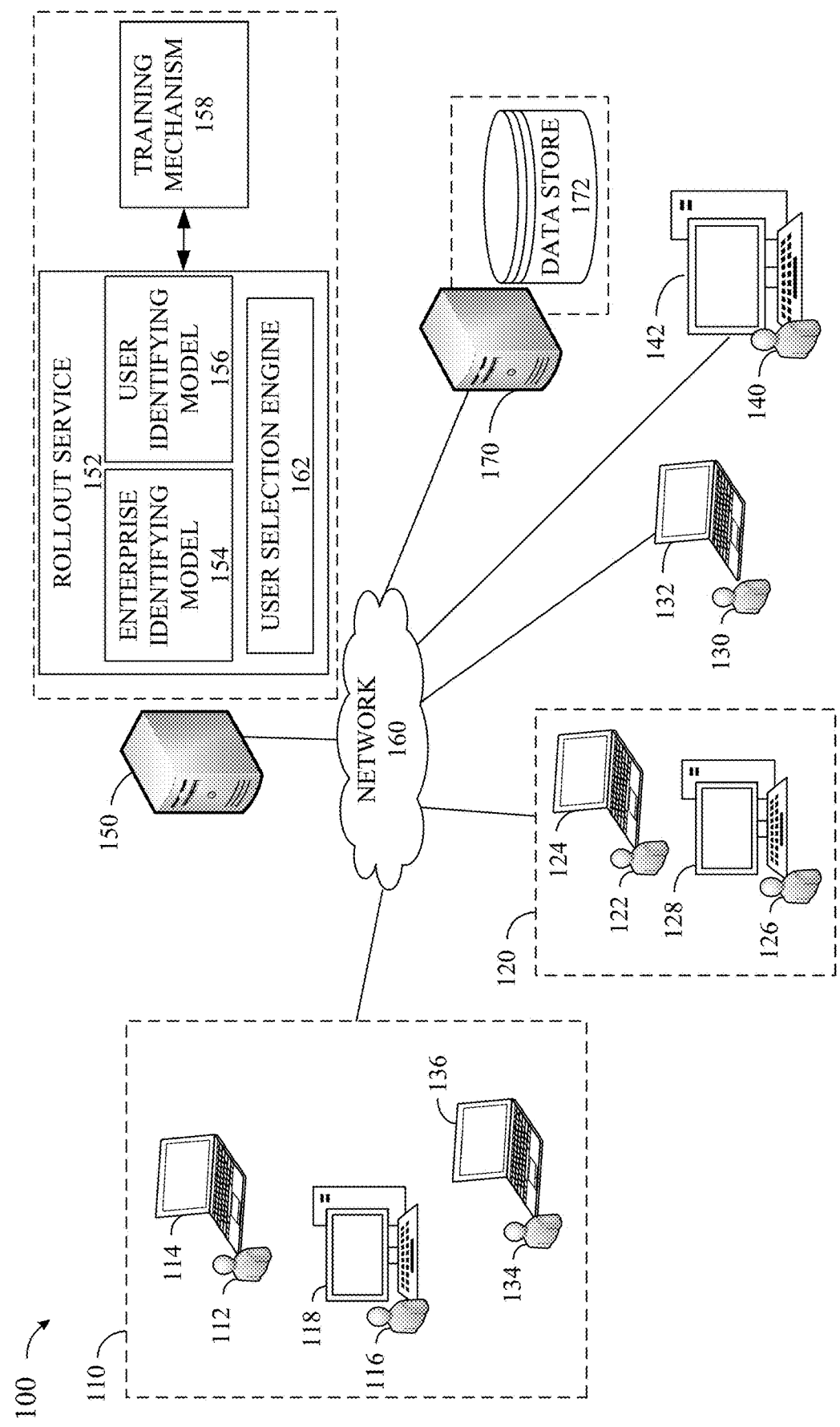
FIG. 1A illustrates an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

When a new feature becomes available for use, development teams often rollout the feature in multiple stages to reduce the risks associated with exposing a large number of users to the new feature. For example, the feature may be rolled out to different groups of users at different time intervals to ensure significant errors or issues are caught and addressed before the feature is exposed to all users. Under this framework, exposure of the new feature may be gradually expanded from a small proportion of users to a larger population based on evaluation of the feature's performance. The process of performing a staged rollout includes selecting a group of users to whom the feature is exposed at each stage of the rollout. Currently, individual users and/or enterprises are often either selected at random and/or they are selected based on parameters relating to testing capacity of the user/enterprise (e.g., the number of users and the like). This process does not take into account specific needs or circumstances of a user and/or enterprise. Thus, there exists the technical problem of lack of mechanisms for taking the needs of individual users and/or enterprises into account when rolling out new features.

Some currently available rollout mechanisms enable an individual user and/or administrator of an enterprise to submit a request to receive new features at late stages of the rollout process. This may involve a general request to be excluded from early stages of feature rollouts for a given time period. For example, a client having an important upcoming project, may submit a request to be excluded from early stages of new feature rollouts for the next few weeks. However, this request is often very general and relates to all new features, as individual users and enterprises are not aware of the nature of the new upcoming features. As a result, even features that are not related to the client's project may be affected. Furthermore, while the request for being placed at late stages of the rollout process may delay rollout of new features, it does not stop the rollout from occurring. To this end, if the late stages of the rollout occur during the time period for which the administrator has requested to be excluded from early stages of rollout, the feature would be rolled out to the client during that time period. For example, the administrator may have requested to be excluded from early-stage rollout for the next 30 days, but the rollout plan specifies that rollout occurs over the next 10 days. In this scenario, the enterprise would receive the feature in the last days of the 10-day period. Thus, there exists another technical problem of inability to choose different rollout stages for different features and/or opting out of receiving a new feature for a given time period.

To address these technical problems and more, in an example, this description provides a technical solution for notifying individual users and/or enterprises of upcoming new features, intelligently identifying new features that may adversely affect an individual user and/or enterprise, intelligently identifying enterprise users that may be adversely affected by a new feature, and/or enabling the individual user and/or enterprise to choose a feature to receive at late stages of the rollout or opt out of receiving for a given time period. To achieve this, the technical solutions may provide a user interface (UI) screen for notifying the individual user and/or enterprise of upcoming features, identifying any upcoming features that may adversely affect them, and/or identifying specific users (e.g., individual users or enterprise users) that may be adversely affected by an upcoming feature. The UI screen may also enable the individual user and/or enterprise to choose features to either receive at late stages of the rollout process or opt out of receiving for a given time period. Furthermore, the UI screen may enable an enterprise administrator to select certain users for receiving one or more features at late stages of the rollout process or opting out of receiving. As a result, the technical solution provides an efficient mechanism for customizing the process of rolling out new features based on the needs and circumstances of the users.

As will be understood by persons of skill in the art upon reading this disclosure, benefits and advantages provided by such implementations can include, but are not limited to, increased individual user and/or enterprise user satisfaction. Technical solutions and implementations provided here optimize and improve the manner of selecting users and/or enterprises for different stages of the rollout process. Furthermore, the technical solutions improve the process of feature rollout and as such improve implementation of new software applications, thus improving operation of computer devices.

As used herein, the term "feature" may refer to any change to a software application that involves a code or configuration change. The change can happen either in the client codebase, or in the backend codebase on the server. A feature can be as large as an application redesign, and as small as a few lines of code or configuration change which is not visible to users. Furthermore, as used herein, the term "rollout" may refer to the process of exposing a new feature to a user population. The rollout process may start with no users having exposure to the new feature and end with the feature being available to a majority of users. The term "staged rollout" may refer to the breaking of the rollout process into different stages, with each stage having a different proportion of the user population exposed to the new feature. A "software application" (or "application") may refer to any computer program designed to perform a group of coordinated functions, tasks, or activities, such as, antivirus application, productivity suite, media creation application, and the like. The term "late stage" may refer to the last few stages of the rollout process, while the term "end stage" may refer to the very last stage of the rollout process. The terms "enterprise," may refer to a company having a plurality of enterprise users that utilize a given software application for which new features may be released. Moreover, the term "enterprise user" may refer to computer users within an enterprise (e.g., employees of an enterprise). The term "administrator" may refer to any enterprise user that has access to or is in charge of managing an enterprise's computing devices. The term "individual user" may refer to individuals that are using software applications on their personal computing device. The term "user entity" may be used to refer to an enterprise, individual user and/or enterprise user. The term "users" may be used to refer to both enterprise users and individual users.

FIG. 1A illustrates an example system 100, upon which aspects of this disclosure may be implemented. The system 100 may include a plurality of enterprises, including a first enterprise 110 and a second enterprise 120, as well as a plurality of individual users including a first individual user 130 and a second individual user 140. Each of the enterprises may include a plurality of enterprise users each having one or more client devices. For example, the enterprise 110 may include an enterprise user 112 associated with (e.g., in possession of or using) a client device 114, an enterprise user 116 associated with a client device 118 and an enterprise user 134 associated with a client device 136. Similarly, the enterprise 120 may include an enterprise user 122 associated with a client device 124 and an enterprise user 126 associated with a client device 128. One or more of the enterprise users may be an administrator with access to a rollout application or service on their client device. In some implementations, two or more enterprises form a cluster (not shown).

Each of the individual users may also be associated with a client device. For example, individual user 130 may be associated with the client device 132 and individual user 140 may be associated with the client device 142. Each of the individual users may also have access to a rollout application or service on their client device. The rollout application may be a local application stored on the user's client device or may be a cloud-based application that is offered as a service and is accessible by the users via a user agent (e.g., a browser).

The system 100 may also include a server 150 which may contain and/or execute a rollout service 152. The server 150 may operate as a shared resource server located at an enterprise accessible by various client devices such as client devices 114, 118, 124, 128, 132, 136, and 142. The server 150 may also operate as a cloud-based server for providing feature rollout services. Although shown as one server, the server 150 may represent multiple servers for performing various different operations. For example, the server 150 may include one or more processing servers for performing the operations of the rollout service 152. In some implementations, the server 150 includes a rollout application which can be accessed to provide rollout services to various enterprises and individual users.

The rollout service 152 may provide for staged rollout of one or more new features. For example, the rollout service 152 may have access to information regarding the users and/or enterprises to which a new feature may apply (e.g., users and/or enterprises that use an application to which the feature applies). This information may be stored locally in the server 150 or it may be stored in a storage server 170 containing a data store 172. The data store 172 may function as a repository in which information relating to user (both individual and enterprise users) and enterprise profiles as well as information relating to rollout of new features may be stored. This information may include various parameters such as the number of enterprise users in each enterprise, client devices and applications used by each enterprise or individual user, the role of each enterprise user in the enterprise (e.g., job title, team to which they belong and the like), the amount of time spent by users on each application, the number of incidents reported by each enterprise and/or individual user, parameters relating to enterprises (e.g., the type of enterprise, the type of business they are in, seasonality of the enterprise's business, whether they are a high value client, whether they have paid for rollout customization services and the like). Furthermore, the data store 172 may include information about a parameter indicating an individual user and/or enterprise's request to opt out of early exposure to new features or a specific new feature, a request to opt out of rollout for a feature, and/or a time period for the duration of the request. Moreover, the data store 172 may include information about the types of upcoming new features that are being rolled out in the future and the rollout plan for each feature. In some implementations, the data store 172 may function as a directory (e.g., an active directory) of users and/or enterprises and the server 170 may operate as a directory server.

Figure 1B:
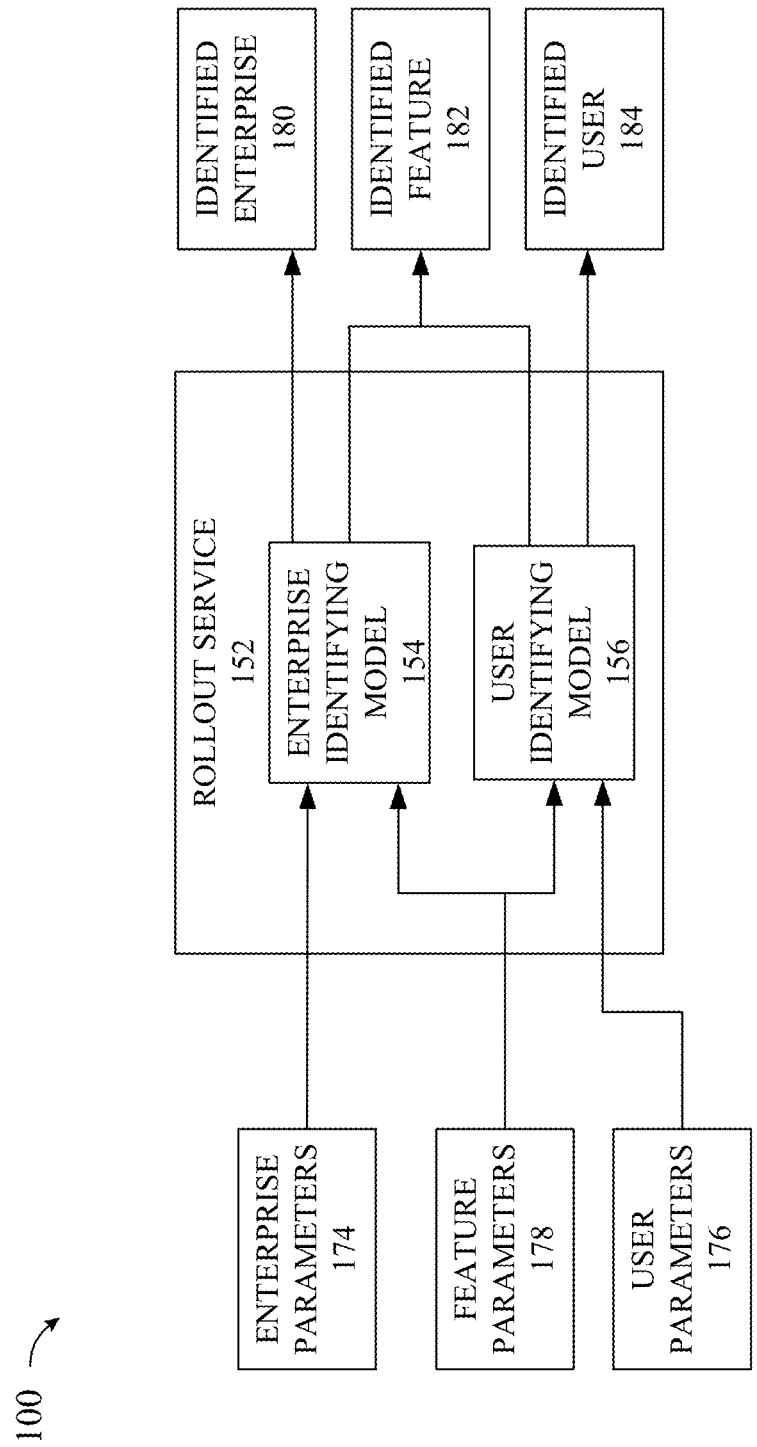
FIG. 1B depicts the data flow between some of the elements of an example system upon which aspects of this disclosure may be implemented.

In some implementations, the rollout service 152 may include an enterprise identifying model 154 and/or a user identifying model 156. The enterprise identifying model 154 may be a machine learning (ML) model that receives the stored information and data relating to new upcoming features and enterprise parameters to identify enterprises for which a new feature may cause problems. This is illustrated in FIG. 1B which depicts the data flow between some of the elements of system 100. The enterprise identifying model 154 may be a model that is trained using training data collected from history of feature rollouts and issues reported as a results of those rollouts by various enterprises. The enterprise identifying model 154 may receive enterprise parameters 174 as an input. The enterprise parameters 174 may include parameters such as the type of enterprise (e.g., educational, business, government, etc.), the size of the enterprise (e.g., the number of licenses used by the enterprise for the application having a feature rollout), the type of business the enterprise is in (e.g., airline, financial, manufacturing, and the like), the number of issues the enterprise has reported as a result of past feature rollouts, the types of features those issues were associated with, the seasonality of the enterprise's business (e.g., the enterprise is often very busy in December), and/or any information available relating to the enterprise's business (e.g., the enterprise has a product release scheduled for next month).

The enterprise parameters 174 as well as feature parameters 178 may be analyzed to determine the likelihood of the new feature causing significant or moderate issues for a given enterprise. Feature parameters 178 may include parameters of a new feature such as the application to which the feature relates, the type of application (e.g., word processing application, spreadsheet application, financial accounting application, etc.), and the type of feature (e.g., UI feature, improvement in code, etc.). The enterprise parameters 174 may be compared to the feature parameters 178 to determine if there are associations between the enterprise parameters and the feature parameters. For example, if the enterprise is in the accounting business and the feature relates to an accounting application, the enterprise identifying model 154 may determine that the feature is likely to cause issues for the enterprise. When the likelihood of the feature causing issues for the enterprise exceeds a given threshold, the feature may be identified as being problematic for the enterprise. For example, when the likelihood that the feature will cause problems is more than 90%, the feature may be identified as a problematic feature. The identified feature may then be provided as an output identified feature 182 and the identified enterprise may be provided as an output identified enterprise 180.

In some implementations, when a feature is identified as being problematic, the rollout service 152 automatically places the enterprise in late stages of the rollout plan to reduce the chances of the feature causing issues for the enterprise. Alternatively, or additionally, the feature may be identified as a potentially problematic feature to the enterprise via a UI of the rollout application or service (e.g., an enterprise portal), thus enabling the enterprise to decide how to manage rollout of the feature. The enterprise (e.g., an enterprise administrator) may examine the notification and choose to ignore it. Alternatively, the enterprise administrator may decide to opt into late-stage rollout for the feature, or they may choose to opt out of receiving the feature for a given time period. Furthermore, the enterprise may choose specific enterprise users for opting out of receiving the feature or opting into late-stage rollout of the feature.

The user identifying model 156 may be a ML model that receives stored user parameters 176 as well as feature parameters 178 to identify specific user entities (individual and enterprise users) or groups of users for which a new feature may cause problems. The user identifying model 156 may be a model that is trained using training data collected from history of feature rollouts and resulting issues associated with the rollouts by various users. The user identifying model 156 may take into account user parameters such as the role or job title of an enterprise user (e.g., CEO or engineer), the team to which the enterprise user belongs (e.g., executive team, human resource team, and the like), the type of client device utilized by a user entity, the type of operating system utilized by the user entity's client device, the number of problems they have reported in the past, upcoming tasks or important projects for the enterprise or individual user (this information may be made available by the enterprise or individual user or may be gleaned from publicly available sources), the amount of time they normally spend using a given application and/or various other user specific information.

This user parameter 176 as well as feature parameters 178 relating to a new upcoming feature may be provided to the user identifying model 156 as inputs. The user identifying model 156 may examine the received inputs to identify user entities that are likely to be negatively affected by the new feature. For example, if an enterprise user is a financial analysis and the new feature relates to a financial analysis application, the user identifying model 156 may determine that the new feature is likely to cause issues for the enterprise user. When the likelihood of the feature causing issues for a user exceeds a given threshold, the feature may be identified as being problematic for the enterprise or individual user. The identified feature 182 and identified user 184 may then be provided as outputs of the user identifying model 156 to the rollout service 152. In some implementations, in addition to identifying specific user entities that may be affected by a new feature, the user identifying model 156 also identifies groups of users that may be affected by the new feature. For example, the user identifying model 156 may determine that enterprise users in the accounting teams are likely to be negatively affected by the new feature.

In some implementations, when a feature is identified as being problematic for a given enterprise or individual user or group of users, the rollout service 152 automatically places the user or group of users in late stages of the rollout plan to reduce the chances of the feature causing issues for the user(s). Alternatively, or additionally, the feature may be identified as a potentially problematic feature to the enterprise to which the user or group of users belong via a UI of the rollout application or service (e.g., an enterprise portal) or to the individual user directly for individual users, thus enabling the enterprise or individual user to decide how to manage rollout of the feature. The enterprise (e.g., an enterprise administrator) or individual user may examine the notification and choose to ignore it. Alternatively, the enterprise administrator or individual user may decide to opt into late-stage rollout for the feature, or they may choose to opt out of receiving the feature for a given time period, if that option is available to them. When the enterprise or individual user decides to opt into late-stage rollout for a feature, or to opt out of receiving the feature, the information about late-stage opt in or opt out of the feature may be stored in the data store 172. Similarly, when the rollout service 152 automatically opts in the enterprise or individual user into late-stage rollout for a feature or opts out of receiving the feature, the information about late-stage opt in or opt out of the feature may be stored in the data store 172.

One or more ML models implemented by the rollout service 152 may be trained by the training mechanism 158. The training mechanism 158 may use training data sets stored in the data store 172 to provide initial and ongoing training for each of the models. Alternatively, or additionally, the training mechanism 158 may use training data sets from elsewhere. In some implementations, the training mechanism 158 uses labeled training data to train one or more of the models via deep neural network(s) or other types of ML models. The initial training may be performed in an offline stage. Additionally, and/or alternatively, the one or more ML models may be trained using batch learning.

As a general matter, the methods and systems described herein may include, or otherwise make use of an ML model to identify enterprises or individual users for which a new feature may be problematic. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity, determine associations between various users, enterprises, devices, application features and/or problems and errors. Such training may be made following the accumulation, review, and/or analysis of data (e.g., user data) over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The rollout service 152 may utilize the information stored in the data store 172 and/or data relating to the new feature to determine the number of rollout stages, the percentage of users at each stage and/or the time period for each stage, as further discussed below with respect to FIG. 2. Once specifics about the rollout stages have been determined, the rollout service 152 may utilize the user selection logic 162 to choose a number of enterprises, enterprise users within the selected enterprises and/or individual users for each stage of the rollout. This may be done by retrieving user and/or enterprise parameters from a data store, examining the parameters and selecting a desired number of individual and enterprise users and enterprises randomly. In some implementations, the user and/or enterprise parameters are examined to ensure the right types of users and/or enterprises are selected for each stage of the rollout process. For example, the process may involve examining individual users and enterprise users to ensure a near equal percentage of users are from each group. Furthermore, the process may involve examining the parameter relating to whether an individual user and/or enterprise user is opted into late-stage rollout or opted out of the new feature.

Various elements of the system 100 may be connected to each other via the network 160. The network 160 may be one or more wired or wireless networks or a combination of wired and wireless networks. The system 100 may be implemented in a single site or spread out in a number of buildings or geographically separated locations. The client devices 114, 118, 124, 128, 132, 136, and 142 may include any stationary or mobile computing device configured to communicate via the network 160. For example, the client devices may include workstations, desktop computers, laptop computers, tablets, phablets, smart phones, cellular phones, personal data assistants (PDA), printers, scanners, telephone, televisions smart watches, wearable computers, gaming devices/computers, head-mounted display devices or any other device that can be subject to software/hardware changes. The internal hardware structure of a client device is discussed in greater detail in regard to FIGS. 5 and 6. While it is possible for a very few of the client devices to have exactly the same hardware/software configurations, most of the client devices may have a unique hardware/software configuration that can be very different from other client devices.

It should be noted that although only a few client devices are shown in each enterprise in FIG. 1, the actual number of client devices in each of the enterprises 110 and 120 may vary depending on the size and type of the organization. For example, large enterprises may include hundreds or thousands of enterprise users and client devices, which may be spread out in different geographical locations. Furthermore, while only two enterprises and two individual users are depicted, an actual system 100 may include many more enterprises and individual users.

FIG. 2 illustrates an example rollout plan 200 for a staged rollout of a new feature. The rollout plan 200 includes 6 rollout stages, each having a time period of one day, such that the entire rollout period takes six days. The number of rollout stages and the time period for each may depend on a number of factors such as the complexity of the new feature (e.g., low risk, high risk, etc.), the total number of users and/or enterprises (e.g., enterprises, enterprises users and individual users) to which the new feature applies, the metrics by which success or failure of the rollout would be determined, and others. The number of stages and the time period for each stage may be determined by a feature rollout service such as the feature rollout service 152 of FIG. 1. Although, all stages are shown as taking the same amount of time, in some implementations, some stages may take more time. For example, there may be more time allocated to the first few stages to ensure most errors are caught in the early stages.

In addition to the number of stages and their time periods, the rollout plan 200 may include the population size for each stage. The population size may be determined by a feature rollout service such as the feature rollout service 152 of FIG. 1. In an example, the population size is determined by a user selection logic such as the user selection logic 162. The population size for each stage may depend on a variety of factors which may include enterprise parameters, parameters relating to the new feature, and the like. In some implementations, the population size may be a set number and may depend on the number of stages. For example, the total percentage may be equally divided among the number of stages (e.g., 100% divided by 6 stages). In other implementations, the last stage would include a certain percentage of the population. For example, 5% may be allocated to the last stage. Thus, the population size may gradually increase from the first stage to the last stage such that by the last stage, a majority of the user population is exposed to the new feature. This is because at each stage, an additional percentage of the user population may be exposed to the new feature. In the rollout plan 200, first, 5% of the population is exposed to the new feature at stage 1. Next, the percentage is increased to 20% of the population at stage 2 (e.g., 15% more than stage 1). The percentage is gradually increased to 50% in stage 3, 75% in stage 4, 95% in stage 5 and so on. During the last stage of the rollout plan 200 (e.g., end stage), 4% of the user population is exposed to the new feature. This population may be referred as the late-stage or end-stage population and may include those users and/or enterprises who have opted into the late stages of the rollout.

However, because the technical solution provided herein enables individual users and/or enterprise to opt out of receiving a new feature (e.g., for a given time period), if the given time period (e.g., 60 days) falls outside of the rollout plan, those individual users and/or enterprises may not receive the new feature during the rollout plan. Those individual users and/or enterprises may be referred to as the post-rollout population since they are able to receive the feature after the rollout plan. Alternatively, the rollout plan may be extended up to the latest time period requested by an individual user and/or enterprise and those individual users and/or enterprises that have opted out of receiving the feature for specific time periods may be placed in the last stage of the rollout plan which may extend over a longer period of time than the earlier stages to ensure all late-stage users and/or enterprises are covered. For example, instead of the last stage time period being one day, the last stage may be extended to 54 days to cover the very last user and/or enterprise that requested not receiving the feature for 60 days.

Figure 3A:
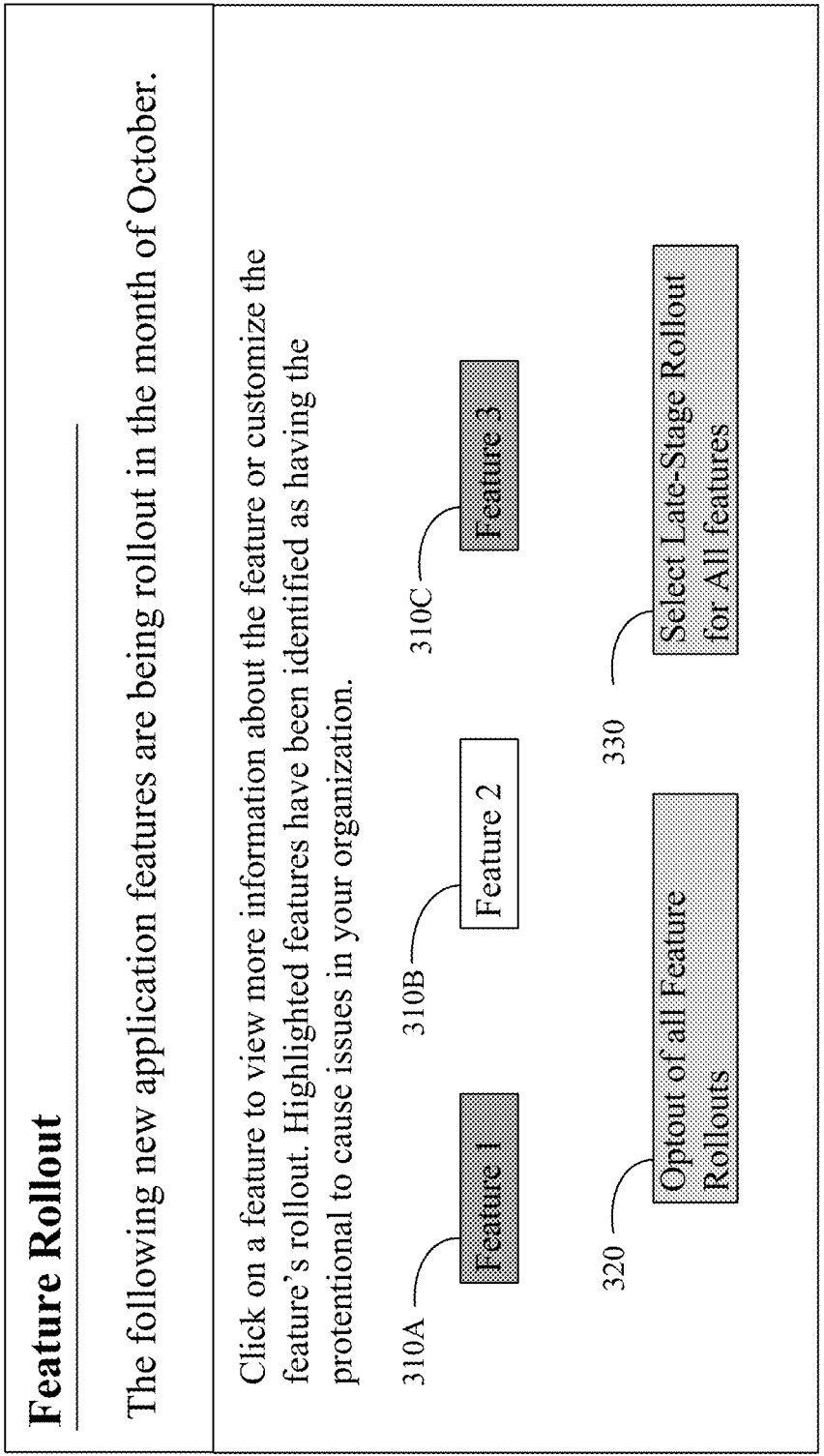
FIGS. 3A-3B depict example GUI screens of a feature rollout application or service
Figure 3B:
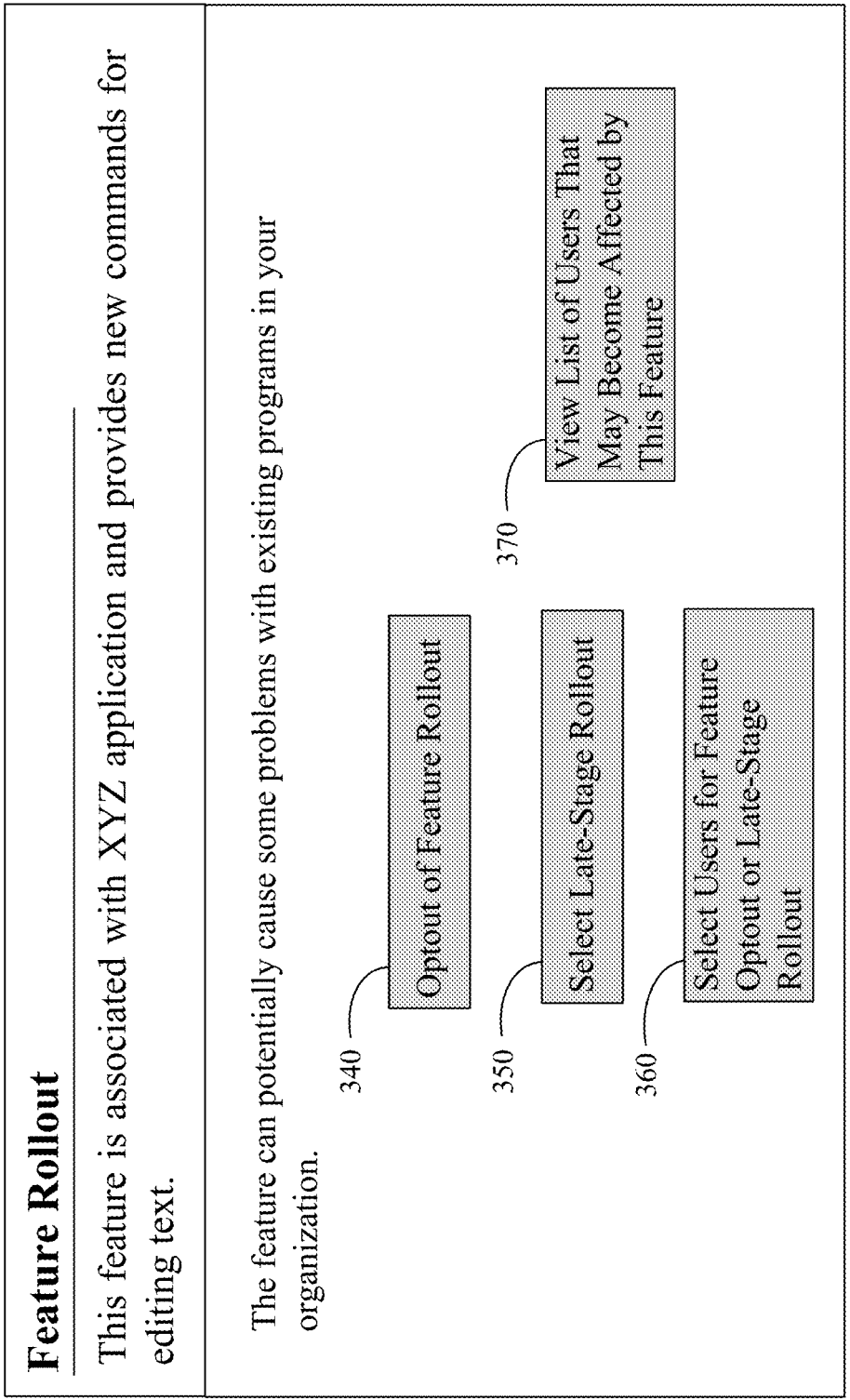

FIGS. 3A-3B depict example GUI screens of a feature rollout application or service. The GUI screen 300A of FIG. 3A may, for example, be displayed by a feature rollout application when the application is first opened (e.g., home page of the application). Alternatively, the GUI screen 300A may be a page or feature of an information technology (IT) management application or offered as part of another management application or service used by administrators of an enterprise. The GUI screen 300A may include a notification about new upcoming features and may provide a timeline when the new features will be rolled out. For example, the GUI screen 300A notifies the enterprise administrator or individual user that the displayed features are scheduled to be released in the upcoming month of October. In some implementations, the GUI screen 300A may also provide a list of features that are currently in the process of being rolled out to notify the enterprise administrator or individual user of current rollout plans.

In order to enable the enterprise administrator or individual user to access more information about the upcoming feature and/or notify them of problematic features, the GUI screen 300A may display a plurality of UI elements (e.g., UI menu options) 310A-310C for each of the upcoming features. One or more UI options may be used to distinguish the features that have been identified as being potentially problematic. For example, the UI elements 310A and 310C are associated with features 1 and 3 and those features have been identified as being potentially problematic. As a result, the UI elements 310A and 310C are highlighted (e.g., they are in a different color than the UI element 310B). Other UI options may be used to distinguish the problematic features. In some implementations, the problematic features may be displayed in a separate portion of the GUI screen 300A or may be displayed in a separate list.

In addition to displaying a list of upcoming features, the GUI screen 300A may provide a UI element 320 for enabling the enterprise administrator or individual user to optout of all new feature rollouts. This may require a time restriction and/or may only be made available to certain clients (e.g., certain high value enterprises). In some implementations, the ability to optout of all upcoming feature rollouts may be offered as a service for purchase. For example, once the administrator clicks on the UI element 320, a separate GUI screen or pop-up menu may be displayed that informs the administrator of the costs associated with opting out of all feature rollouts. Optout of feature rollouts may require a time restriction, as most software developers require that their new features be eventually adopted. As a result, selection of the UI element 320 may result in display of a pop-up menu that enables the enterprise administrator or individual user to choose a time period for opting out of feature rollouts. The available time periods may depend on the type of enterprise or individual user (e.g., high value user), the type of rollout plan the enterprise or individual user has purchased and the like. For example, a high value enterprise or one that has purchased a more costly plan may be able to optout of all feature rollouts for 90 days, while lower value enterprises or those that purchased a lower cost plan may be able optout for a maximum of 30 days.

The GUI screen 300A may also include a UI element 330 for enabling the enterprise administrator or individual user to select to enroll in late-stage rollout for all upcoming features. Similar to optout of all features, enrolling in late-stage rollout may require a time restriction. For example, the enterprise administrator or individual user may be required to specify the period of time during which they desire to be selected as late-stage rollout users. However, the difference between enrolling in late-stage rollout and opting out of feature rollouts is that opting out of feature rollouts may remove the enterprise or individual user from the rollout plan. For example, if the rollout plan designates a 10-day rollout period and the enterprise has requested to optout of feature rollouts for the next 30 days, they will not be included in the rollout plan, but may receive the feature post-rollout. However, if the enterprise has enrolled into late-stage rollout for the next 30 days, they will receive the feature during the late-stages of the 10-day rollout period (e.g., on day 10).

When a displayed feature is selected by, for example, clicking on one of the UI elements 310A-310C, a GUI screen such as GUI screen 300B of FIG. 3B may be displayed. The GUI screen 300B may display more information about the selected feature. For example, the GUI screen 300B may inform the enterprise administrator or individual user about the application with which the feature is associated and/or the types of improvements and options it provides. In some implementations, the GUI screen 300B provides information about any known errors or bugs associated with the feature.

The GUI screen 300B may also provide a notification to the enterprise administrator or individual user, if the feature has been identified as potentially being problematic for the individual user and/or enterprise. Moreover, the GUI screen 300B may provide a UI element 340 for opting out of rollout for this particular feature and a UI element 350 for enrolling in late-stage rollout for the identified feature. Similar to opting out of all features and enrolling in late-stage rollout of all features, opting out of rollout for a specific feature or enrolling in late-stage rollout of a feature may require time restrictions. As such, once one of the UI elements 340 or 350 is selected, a pop-up menu may be displayed requiring the enterprise administrator or individual user to select a time period for optout or enrolling in late-stage rollout. Again, the amount of time provided may vary depending on the type of individual user and/or enterprise or the rollout plan they have purchased.

Furthermore, the GUI screen 300B may include a UI element 360 for selecting specific users to optout of the feature rollout or enroll in late-stage rollout. This may be used, when an enterprise administrator is aware of one or more enterprise users who because of their position or upcoming projects may be adversely affected by feature rollouts or by the specific identified feature. By selecting the UI element 360, the enterprise administrator may be able to identify the one or more enterprise users or groups of enterprise users (e.g., by alias or group identifier, etc.). In addition to being able to select specific enterprise users, selection of the UI element 360 may also result in the display of a pop-up menu or other UI element requiring the enterprise administrator to set a time restriction for the optout or late-stage enrollment.

In some implementations, the GUI screen 300B includes a UI element 370 to enable display of a list of one or more enterprise users that may be adversely affected by the identified feature. This may occur, when the rollout service identifies one or more enterprise users that are likely to be affected by the identified feature. In some implementations, the list of enterprise users is displayed within the GUI screen 300B. When the UI element 370 is selected, a pop-up menu or different UI screen may be displayed that presents a list of one or more enterprise users or groups of enterprise users that have been identified as being affected by the feature. In some implementations, the enterprise administrator is able to optout one or more of the listed enterprise users from the feature rollout or enroll them in late-stage rollout.

Figure 4:
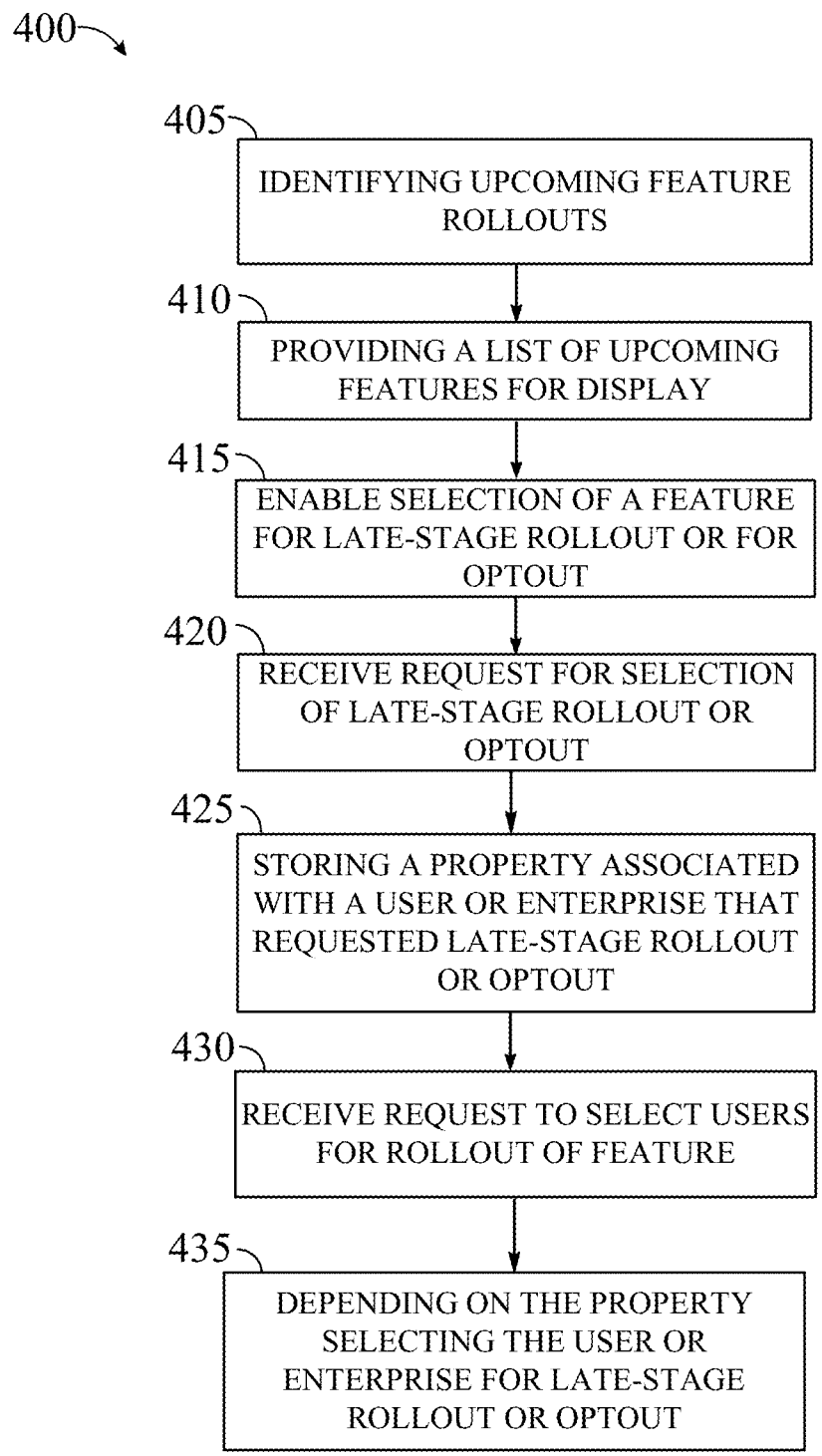
FIG. 4 is a flow diagram showing an example method for customizing rollout of application features.

FIG. 4 is a flow diagram depicting an example method 400 for customizing rollout of application features. In an example, one or more steps of method 400 may be performed by a backend server such as the server 150 of FIG. 1. For example, some steps may be performed by a rollout service such as the rollout service 152 of FIG. 1, while other steps may be performed by a user selection logic such as the user selection logic 162 of FIG. 1.

At 405, the method 400 may begin by identifying one or more features that are scheduled for feature rollout in the near future. This may occur by examining a list of upcoming feature rollouts. Once upcoming feature rollouts are identified, at 410, the list may be provided for display to an enterprise administrator or individual user via, for example, a feature rollout application or service (e.g., an enterprise portal). In an example, the list may be displayed to enterprise administrators as upcoming feature rollouts for the enterprise. As such, the list of features may vary depending on the application used by the enterprise and may be limited to features associated with those applications.

Once the upcoming features are displayed to the enterprise administrator or individual user, the feature rollout application or service may provide UI elements for enabling selection of at least one of the upcoming application features, at 415. Once a feature is selected, the feature rollout application or service may provide a mechanism for enabling the enterprise administrator or individual user to enroll in late-stage rollout for the feature or optout of receiving the feature for a given time period. In some implementations, the enterprise administrator or individual user may be able to and/or may be required to set a time limit for the duration of the late-stage rollout and/or optout. This may provide the enterprise or individual user the ability to ensure the new feature is not rolled out during specific time periods (e.g., during a busy or important time for the enterprise) or ensure that the enterprise or individual user receives the feature at late stages of the staged rollout to reduce the chances of encountering early use feature faults. In some implementations, the time period cannot be longer than a predetermined threshold (e.g., no more than 6 weeks). In an alternative implementation, the threshold may vary depending on the enterprise or individual user and/or services they have purchased. For example, an enterprise being considered as a high value client (e.g., having a significantly large number of enterprise user or paying additional fees for opting into late-stage rollout or optout) may be able to bypass or increase the time threshold.

In some implementations, the enterprise administrator may identify a number of enterprise users that, for various reasons, should not be exposed to early stages of a rollout. For example, certain enterprise users may be identified as having a volume of complaints and/or issues (e.g., with their client devices or applications they use). Other enterprise users may be identified as being responsible for important and/or time sensitive project and as such may not be able to afford being exposed to faulty features. An enterprise administer may identify these enterprise users and submit a request to the rollout service to opt-in the specific enterprise users into late-stage rollout or opting the specific users out of receiving the feature. The request may include user identifications for the enterprise users for which late-stage rollout or optout is requested.

Once the request to opt into late-stage rollout or optout of the rollout process is received via the rollout application or service, the request may be transmitted to the feature service, which may receive the request, at 420. The request may include an enterprise identifier and/or user identifiers for the enterprise and/or users that have opted into late-stage rollout or opted out of the rollout process. Furthermore, the request may include an identifier for the selected feature and the selected time restriction associated with the request. Once the indication is received that a user (individual user or enterprise user) and/or enterprise has requested to be a late-stage receiver for a selected feature or has opted out of receiving the feature during the rollout process, this information may be stored as a property in a data set for future use, at 425. For example, a parameter may be set for the user (individual user or enterprise user) and/or enterprise in a database identifying various users and/or enterprises. This may be stored in a storage server accessible to the rollout server (e.g., data store 172 of storage server 170 of FIG. 1). The parameter may be associated with the type of user (individual user or enterprise user). For example, the parameter may identify the user (individual user or enterprise user) and/or enterprise as a late-stage receiver or as not receiving the feature during rollout. When the parameter identifies an enterprise as a late-stage receiver or as opting out of receiving a feature, all enterprise users of that enterprise may automatically be designated as late-stage receivers or as being opted out.

After storing the user and/or enterprise parameter, method 400 may proceed to receive a request for selection of users for a staged rollout, at 430. The request may be received after a request for initiating a feature rollout has been received. This may occur, when a feature flight server (which may be the same or may be included in the rollout server) transmits a request for initiating rollout of the new feature. This may be done by using a flight Application Program Interface (API). Once the request for initiating the rollout has been received, a request for selection of users may be made as part of the process of preparing a rollout plan (e.g., number of stages, population sizes for each stage and the like) for the new feature. Alternatively, the request may be received after a rollout plan has been prepared. In some implementation, instead of receiving a request for selection of users, the selection process begins automatically as part of the rollout plan.

Once it is determined that user selection needs to be made, method 400 may proceed to retrieve information about the various users and/or enterprises. This information may include a variety of parameters such as the applications the users utilize to determine if the new feature applies to the users. Furthermore, the information may include the parameter related to whether the user (individual user or enterprise user) or enterprise falls into late-stage or opted out categories. Thus, the data stored about late stage or optout may be retrieved to assist in selecting the users for each stage.

Method 400 may then proceed to select users or enterprises for late-stage rollout or identifying them as opted out based on the retrieved parameter, at 435. When it is determined that a user (individual user or enterprise user) and/or enterprise has opted out of receiving the feature, they may be removed from the list of users and/or enterprises from which a selection may be made for the rollout. In other implementations, excluding the user (individual user or enterprise user) and/or enterprise from early stages or completely from the rollout may simply mean that the selection mechanisms check the parameter associated with late stage or optout before selecting a user and/or enterprise for early stages or for the rollout.

In practice to exclude certain users, one or more flight rollout configuration policies may be revised to include a revised rotation detail based on the enterprise type. For example, the flight configuration generator may be revised to support an enterprise stage. This may be done to add a new rotation type based on the enterprise stage. Furthermore, a new case may be added to the flight configuration utility to support the new rotation type. Cases may also be added to the flight configuration to support searching flight types.

Figure 5:
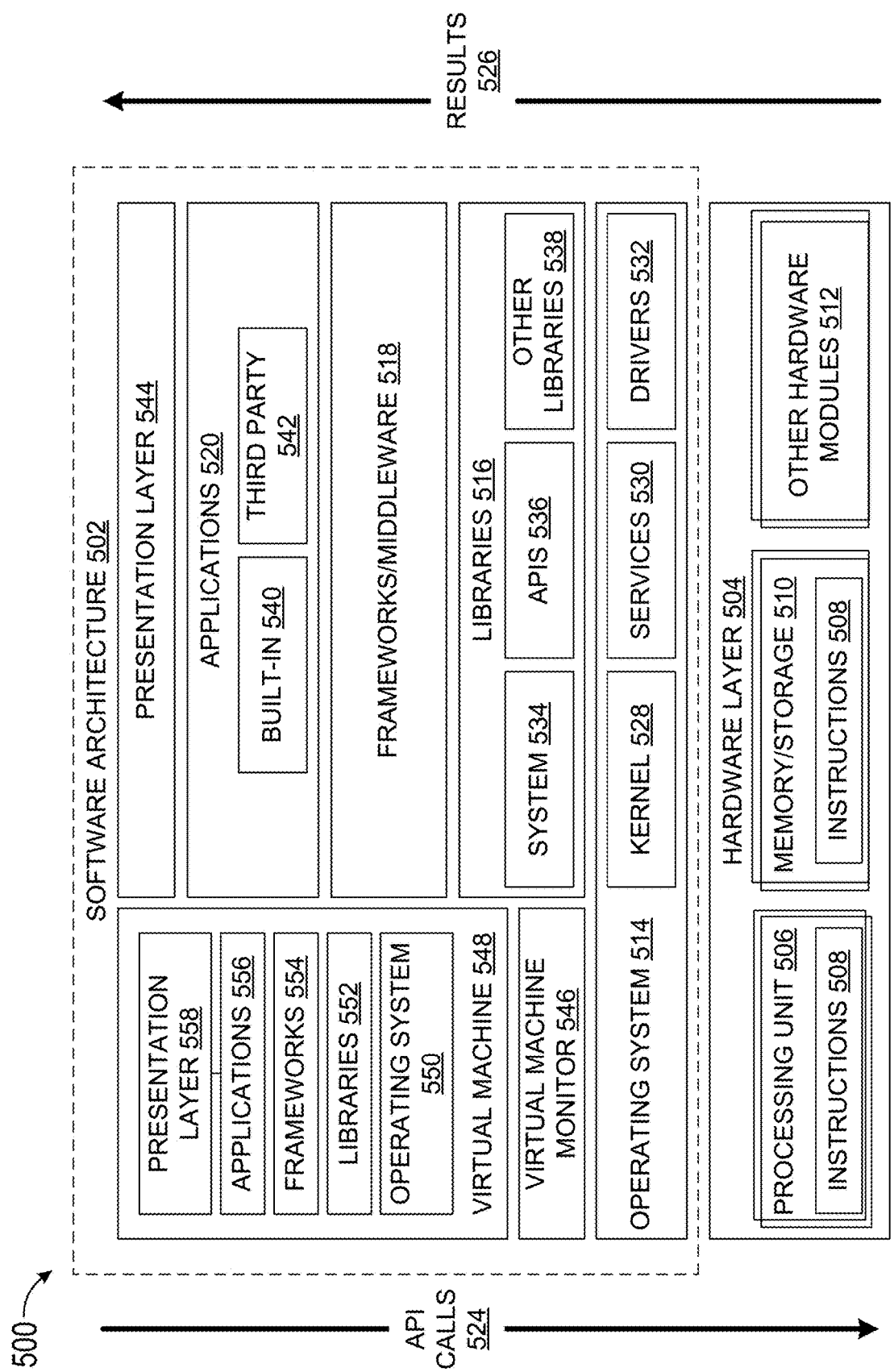
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
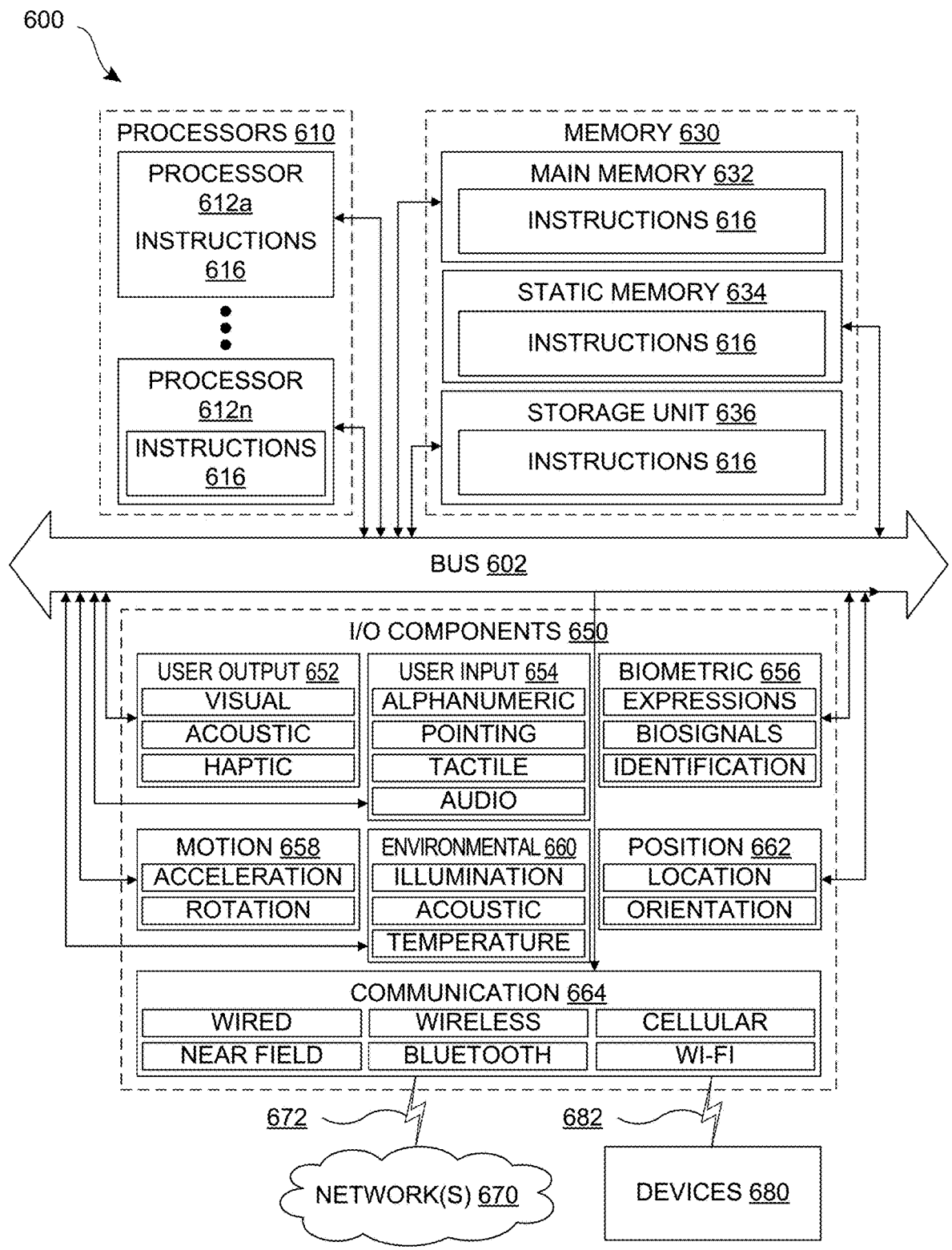
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
providing a list of one or more software application features for display on a user interface screen, the one or more software application features being software application features that are scheduled for a staged rollout;
enabling selection of one of the one or more software application features for enrolling in late-stage rollout or opting out of the staged rollout;
receiving a request for enrolling a user entity in late-stage rollout or opting the user entity out of the staged rollout;
storing a property associated with the user entity in a data store, the property indicative of the user entity enrolling in late-stage rollout or opting out of the staged rollout;
accessing the stored property, when selecting a plurality of enterprises or users for the staged rollout of the one of the one or more software application features; and
depending on the accessed property, selecting the user entity for late-stage rollout or not selecting the user entity for the staged rollout.

Item 2. The data processing system of item 1, wherein the request includes at least one of an enterprise identifier or a user identifier for the user entity that is enrolling in late-stage rollout or opting out of the staged rollout.

Item 3. The data processing system of items 1 or 2, wherein opting out of the staged rollout removes the user entity from a list of user entities that can be selected for the staged rollout.

Item 4. The data processing system of any preceding item, wherein enabling selection of one of the one or more software application features for enrolling in late-stage rollout or opting out of the staged rollout includes:
providing a first user interface element for selection of the one of the one or more software application features;
providing a second user interface element for selection of enrolling in late-stage rollout for the selected one of the one or more software application features; and
providing a third user interface element for selection of opting out of the staged rollout for the selected one of the one or more software application features.

Item 5. The data processing system of any preceding item, wherein the executable instructions when executed by the processor, further cause the data processing system to perform functions of:
automatically identifying an enterprise for which rollout of the one of the one or more software application features may cause problems; and enabling display of the notification to an enterprise administrator to notify the enterprise of possible problems with rollout of the one of the one or more software application features.

Item 6. The data processing system of item 5, wherein identifying the enterprise is performed by a machine-learning (ML) model.

Item 7. The data processing system of any preceding item, wherein the executable instructions when executed by the processor, further cause the data processing system to perform functions of:
identifying at least one of an individual user or enterprise user for which rollout of the one of the one or more software application features may cause problems; and
enabling display of the notification to the individual user or to an enterprise administrator associated with the enterprise user to notify the individual or the enterprise administrator of possible problems with rollout of the one of the one or more software application features.

Item 8. A method for customizing a rollout process of software application features, comprising:
providing a list of one or more software application features for display on a user interface screen, the one or more software application features being software application features that are scheduled for a staged rollout;
enabling selection of one of the one or more software application features for enrolling in late-stage rollout or opting out of the staged rollout;
receiving a request for enrolling a user entity in late-stage rollout or opting the user entity out of the staged rollout;
storing a property associated with the user entity in a data store, the property indicative of the user entity enrolling in late-stage rollout or opting out of the staged rollout;
accessing the stored property, when selecting a plurality of enterprises or users for the staged rollout of the one of the one or more software application features; and
depending on the accessed property, selecting the user entity for late-stage rollout or not selecting the user entity for the staged rollout.

Item 9. The method of item 8, wherein the request includes at least one of an enterprise identifier or a user identifier for the user entity that is enrolling in late-stage rollout or opting out of the staged rollout.

Item 10. The method of items 8 or 9, wherein opting out of the staged rollout removes the user entity from a list of user entities that can be selected for the staged rollout.

Item 11. The method of any of items 8-10, wherein enabling selection of one of the one or more software application features for enrolling in late-stage rollout or opting out of the staged rollout includes:
providing a first user interface element for selection of the one of the one or more software application features;
providing a second user interface element for selection of enrolling in late-stage rollout for the selected one of the one or more software application features; and
providing a third user interface element for selection of opting out of the staged rollout for the selected one of the one or more software application features.

Item 12. The method of any of items 8-11, further comprising:
automatically identifying an enterprise for which rollout of the one of the one or more software application features may cause problems; and
enabling display of the notification to an enterprise administrator to notify the enterprise of possible problems with rollout of the one of the one or more software application features.

Item 13. The method of item 12, wherein identifying the enterprise is performed by a machine-learning (ML) model.

Item 14. The method of any of items 8-13, further comprising:
identifying at least one of an individual user or enterprise user for which rollout of the one of the one or more software application features may cause problems; and
enabling display of the notification to the individual user or to an enterprise administrator associated with the enterprise user to notify the individual or the enterprise administrator of possible problems with rollout of the one of the one or more software application features.

Item 15. A non-transitory computer readable medium on which are stored instructions that when executed cause a programmable device to:
provide a list of one or more software application features for display on a user interface screen, the one or more software application features being software application features that are scheduled for a staged rollout;
enable selection of one of the one or more software application features for enrolling in late-stage rollout or opting out of the staged rollout;
receive a request for enrolling a user entity in late-stage rollout or opting the user entity out of the staged rollout;
store a property associated with the user entity in a data store, the property indicative of the user entity enrolling in late-stage rollout or opting out of the staged rollout;
access the stored property, when selecting a plurality of enterprises or users for the staged rollout of the one of the one or more software application features; and
depending on the accessed property, select the user entity for late-stage rollout or not selecting the user entity for the staged rollout.

Item 16. The non-transitory computer readable medium of item 15, wherein the request includes at least one of an enterprise identifier or a user identifier for the user entity that is enrolling in late-stage rollout or opting out of the staged rollout.

Item 17. The non-transitory computer readable medium of items 15 or 16, wherein opting out of the staged rollout removes the user entity from a list of user entities that can be selected for the staged rollout.

Item 18. The non-transitory computer readable medium of any of items 15-17, wherein enabling selection of one of the one or more software application features for enrolling in late-stage rollout or opting out of the staged rollout includes:
provide a first user interface element for selection of the one of the one or more software application features;
provide a second user interface element for selection of enrolling in late-stage rollout for the selected one of the one or more software application features; and provide a third user interface element for selection of opting out of the staged rollout for the selected one of the one or more software application features.

Item 19. The non-transitory computer readable medium of any of items 15-18, wherein the instructions when executed further cause the programmable device to:
automatically identify an enterprise for which rollout of the one of the one or more software application features may cause problems; and
enable display of the notification to an enterprise administrator to notify the enterprise of possible problems with rollout of the one of the one or more software application features.

Item 20. The non-transitory computer readable medium of any of items 15-19, wherein the instructions when executed further cause the programmable device to:
identify at least one of an individual user or enterprise user for which rollout of the one of the one or more software application features may cause problems; and
enable display of the notification to the individual user or to an enterprise administrator associated with the enterprise user to notify the individual or the enterprise administrator of possible problems with rollout of the one of the one or more software application features.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
displaying a list of one or more software application features on a user interface screen, the one or more software application features being software application features that are scheduled for a staged rollout;
displaying a first selectable user interface element for selecting one of the one or more software application features to enroll the one of the one or more software application features in late-stage rollout or opting out of the staged rollout;
receiving a user request, via a second selectable user interface element, for enrolling a user entity in late-stage rollout or opting the user entity out of the staged rollout for the one of the one or more software application features;
enrolling the user entity in late-stage rollout of the one of the one or more software application features or opting out of the staged rollout of the one of the one or more software application features by providing a property associated with the user entity for storage in a data store, the property indicative of the user entity enrolling in late-stage rollout or opting out of the staged rollout;
wherein, when selecting a plurality of enterprises or users for the staged rollout of the one of the one or more software application features, the property is accessed to determine if the user entity enrolled in late-stage rollout of the one of the one or more software application features or opted out of the staged rollout of the of the one or more software application features, and when the user entity is determined to have enrolled in late-stage rollout of the one of the one or more software application features or opted out of the staged rollout of the one of the one or more software application features, selecting the user entity for late-stage rollout or not selecting the user entity for the staged rollout.

2. The data processing system of claim 1, wherein the request includes at least one of an enterprise identifier or a user identifier for the user entity that is enrolling in late-stage rollout or opting out of the staged rollout.

3. The data processing system of claim 1, wherein opting out of the staged rollout removes the user entity from a list of user entities that can be selected for the staged rollout.

4. The data processing system of claim 1, wherein
the second user interface element is selectable for enrolling in late-stage rollout for the selected one of the one or more software application features and a third user interface element is provided for selection of opting out of the staged rollout for the selected one of the one or more software application features.

5. The data processing system of claim 1, wherein the executable instructions when executed by the processor, further cause the data processing system to perform functions of:
automatically identifying an enterprise for which rollout of the one of the one or more software application features may cause problems; and
displaying a notification to an enterprise administrator to notify the enterprise of possible problems with rollout of the one of the one or more software application features.

6. The data processing system of claim 5, wherein identifying the enterprise is performed by a machine-learning (ML) model.

7. The data processing system of claim 1, wherein the executable instructions when executed by the processor, further cause the data processing system to perform functions of:
identifying at least one of an individual user or enterprise user for which rollout of the one of the one or more software application features may cause problems; and
displaying a notification to the individual user or to an enterprise administrator associated with the enterprise user to notify the individual or the enterprise administrator of possible problems with rollout of the one of the one or more software application features.

8. A method for customizing a rollout process of software application features, comprising:
displaying a list of one or more software application features for display on a user interface screen, the one or more software application features being software application features that are scheduled for a staged rollout;
displaying a first selectable user interface element for selecting of one of the one or more software application features to enroll the one of the one or more software application features in late-stage rollout or opting out of the staged rollout;
receiving a user request, via a second selectable user interface element, for enrolling a user entity in late-stage rollout or opting the user entity out of the staged rollout for the one of the one or more software application features;
enrolling the user entity in late-stage rollout of the one of the one or more software application features or opting out of the staged rollout of the one of the one or more software application features by providing a property associated with the user entity for storage in a data store, the property indicative of the user entity enrolling in late-stage rollout or opting out of the staged rollout;
wherein, when selecting a plurality of enterprises or users for the staged rollout of the one of the one or more software application features, the property is accessed to determine if the user entity enrolled in late-stage rollout of the one of the one or more software application features or opted out of the staged rollout of the of the one or more software application features, and when the user entity is determined to have enrolled in late-stage rollout of the one of the one or more software application features or opted out of the staged rollout of the one of the one or more software application features, selecting the user entity for late-stage rollout or not selecting the user entity for the staged rollout.

9. The method of claim 8, wherein the request includes at least one of an enterprise identifier or a user identifier for the user entity that is enrolling in late-stage rollout or opting out of the staged rollout.

10. The method of claim 8, wherein opting out of the staged rollout removes the user entity from a list of user entities that can be selected for the staged rollout.

11. The method of claim 8, wherein
the second user interface element is selectable for enrolling in late-stage rollout for the selected one of the one or more software application features and a third user interface element is provided for selection of opting out of the staged rollout for the selected one of the one or more software application features.

12. The method of claim 8, further comprising:
automatically identifying an enterprise for which rollout of the one of the one or more software application features may cause problems; and
displaying a notification to an enterprise administrator to notify the enterprise of possible problems with rollout of the one of the one or more software application features.

13. The method of claim 12, wherein identifying the enterprise is performed by a machine-learning (ML) model.

14. The method of claim 8, further comprising:
identifying at least one of an individual user or enterprise user for which rollout of the one of the one or more software application features may cause problems; and
displaying a notification to the individual user or to an enterprise administrator associated with the enterprise user to notify the individual or the enterprise administrator of possible problems with rollout of the one of the one or more software application features.

15. A non-transitory computer readable medium on which are stored instructions that when executed cause a programmable device to:
display a list of one or more software application features for display on a user interface screen, the one or more software application features being software application features that are scheduled for a staged rollout;
display a first selectable user interface element for selecting of one of the one or more software application features to enroll the one of the one or more software application features in late-stage rollout or opting out of the staged rollout;
receive a user request, via a second selectable user interface element, for enrolling a user entity in late-stage rollout or opting the user entity out of the staged rollout for the one of the one or more software application features;
enroll the user entity in late-stage rollout of the one of the one or more software application features or opting out of the staged rollout of the one of the one or more software application features by providing a property associated with the user entity for storage in a data store, the property indicative of the user entity enrolling in late-stage rollout or opting out of the staged rollout;

wherein, when selecting a plurality of enterprises or users for the staged rollout of the one of the one or more software application features, the property is accessed to determine if the user entity enrolled in late-stage rollout of the one of the one or more software application features or opted out of the staged rollout of the of the one or more software application features, and when the user entity is determined to have enrolled in late-stage rollout of the one of the one or more software application features or opted out of the staged rollout of the one of the one or more software application features, select the user entity for late-stage rollout or not selecting the user entity for the staged rollout.

16. The non-transitory computer readable medium of claim 15, wherein the request includes at least one of an enterprise identifier or a user identifier for the user entity that is enrolling in late-stage rollout or opting out of the staged rollout.

17. The non-transitory computer readable medium of claim 15, wherein opting out of the staged rollout removes the user entity from a list of user entities that can be selected for the staged rollout.

18. The non-transitory computer readable medium of claim 15, wherein the second user interface element is selectable for enrolling in late-stage rollout for the selected one of the one or more software application features and a third user interface element is provided for selection of opting out of the staged rollout for the selected one of the one or more software application features.

19. The non-transitory computer readable medium of claim 15, wherein the instructions when executed further cause the programmable device to:

automatically identify an enterprise for which rollout of the one of the one or more software application features may cause problems; and displaying a notification to an enterprise administrator to notify the enterprise of possible problems with rollout of the one of the one or more software application features.

20. The non-transitory computer readable medium of claim 15, wherein the instructions when executed further cause the programmable device to:

identify at least one of an individual user or enterprise user for which rollout of the one of the one or more software application features may cause problems; and displaying a notification to the individual user or to an enterprise administrator associated with the enterprise user to notify the individual or the enterprise administrator of possible problems with rollout of the one of the one or more software application features.

* * * * *